April 21, 1953    N. E. WAHLBERG    2,635,895
VEHICLE WHEEL SUSPENSION
Filed June 24, 1950    2 SHEETS—SHEET 1

INVENTOR.
NILS ERIK WAHLBERG
BY
Carl J. Barker
ATTORNEY

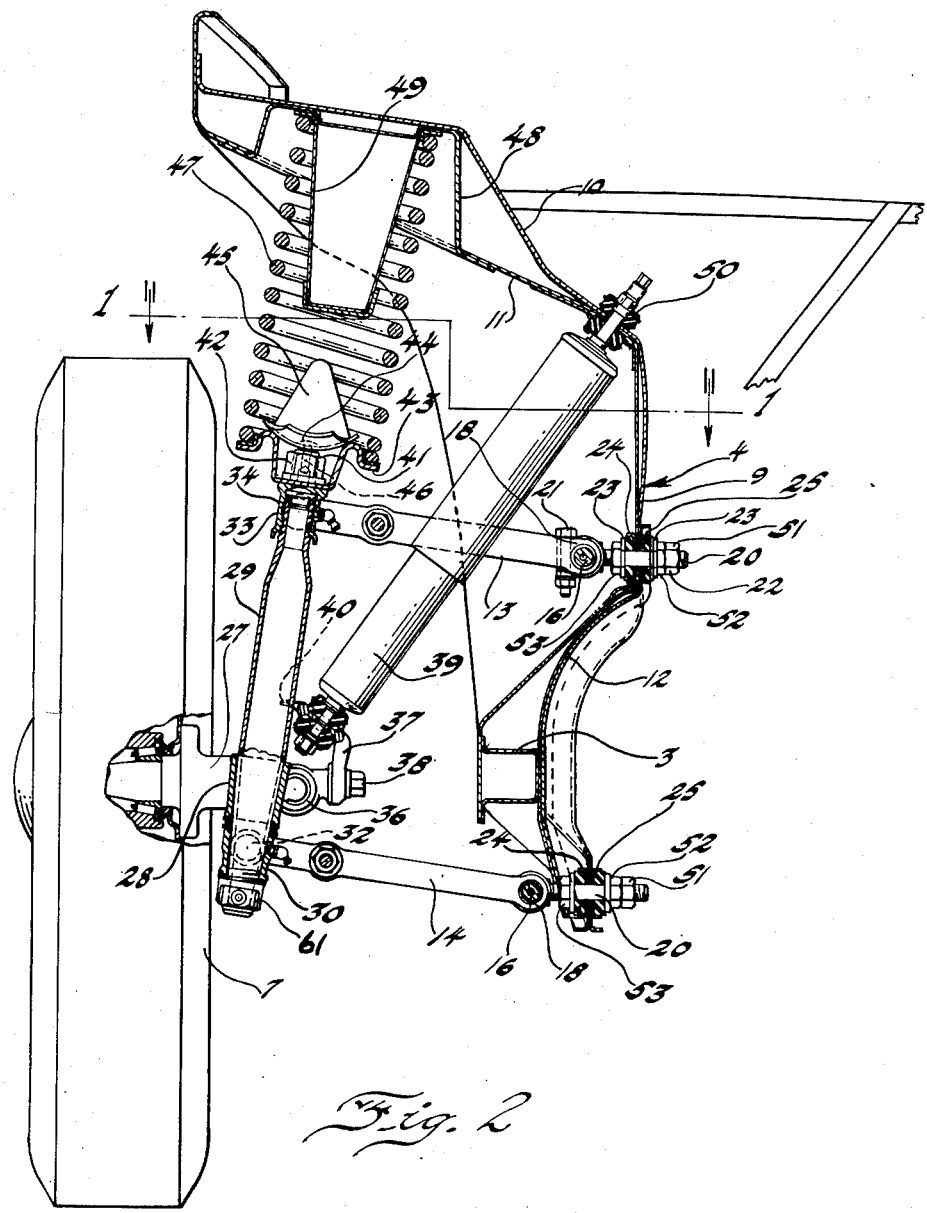

Patented Apr. 21, 1953

2,635,895

UNITED STATES PATENT OFFICE 2,635,895

VEHICLE WHEEL SUSPENSION

Nils Erik Wahlberg, Chicago, Ill., assignor to Nash-Kelvinator Corporation, Kenosha, Wis., a corporation of Maryland Application June 24, 1950, Serial No. 170,109

6 Claims. (Cl. 280—96.2)

This invention relates to a suspension device for suspending a vehicle body relative to its wheels.

One object of the invention is to provide a generally improved suspension system which is less costly than other suspension systems now in use.

A further object of the invention is to provide means for suspending a vehicle body relative to one of its wheels, wherein the suspension assembly is secured directly to a portion of the vehicle body.

A further object of the invention is to provide a novel load carrying arrangement permitting elimination of the usual elaborate crosswise structural member.

A still further object is to provide a novel control arm arrangement with means for controlling "play" in the bearings.

Other objects and advantages of the invention will become apparent upon reading the following specification and upon examination of the drawings, in which:

Figure 2 is a sectional view taken on line 2—2 of Figure 1; and

Figure 1:
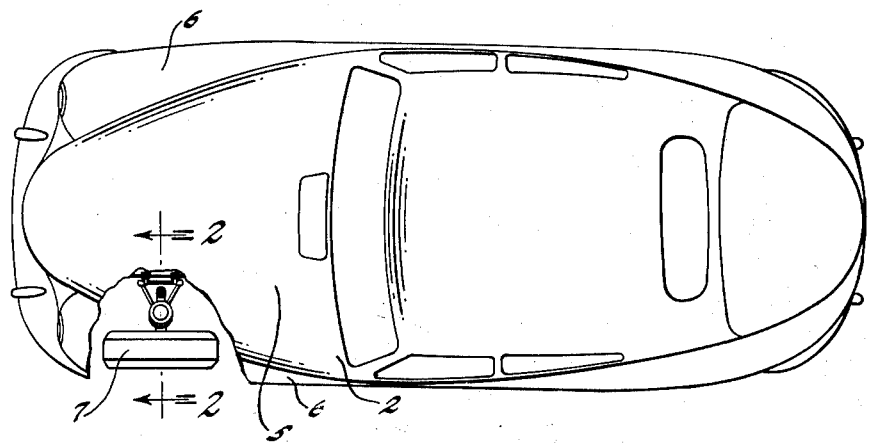
Figure 1 is a plan view of an automotive vehicle showing the suspension means as taken on line 1—1 of Figure 2.

Heretofore it has been common practice, particularly with respect to the suspension of an automotive vehicle body relative to its front wheels, to provide a rather elaborate cross member which is secured to the frame of the automotive vehicle from which cross member the suspension assembly is hung. In the present invention the load carrying arrangement is such that the suspension assembly is hung directly from the vehicle body, thereby eliminating the necessity of a structural cross member.

The vehicle body 2 is made up generally of sheet metal members which are welded to a frame portion 3 providing a "unitized" body and frame structure. At the forward end of the automotive vehicle a portion of the body is formed in the manner of a wheel housing 4, which housing is ultimately completely covered by the hood 5 and the front fender 6, said wheel housing substantially embracing one of the front wheels 7. One side of the wheel housing 9 forms a side wall of the engine compartment. The wheel housing 4 is generally comprised of two sheet metal stampings 10 and 11 which are welded together at various points to form a rigid housing structure. A third sheet metal stamping 12 provides additional rigidity to the wheel housing in the region where the control arms 13 and 14 are secured to the wheel housing 4.

The control arms 13 and 14 may be made up of a common forging or stamping 15, four of which forgings or stampings would be utilized in making up the two control arm assemblies 13 and 14. The arms 15 are free to swivel on cross shaft 16, each end of which shaft is provided with a threaded portion 17 on which the internally threaded hubs 18 are free to swivel. It will be noted that each control arm is somewhat V-shaped and the apexes of the "V's" are back to back. A bolt 57 extends through both control arms and adjusting nuts 58 may be loosened and re-tightened to draw the apexes 59 of the control arms toward or away from each other for the purpose of putting tension on the threads where the control arms are mounted on the threaded ends of cross shaft 16 and the threaded bolt portions 35 of the forging 33. By putting tension on the threads this undesirable noises are substantially eliminated.

A grease fitting 19 may be threaded into the ends of the shaft member 16 for lubrication of the bearing threads of hub 18 and shaft member threaded portion 17. Bolt members 20 may be mounted onto the threaded portions 17 of shaft member 16 and may be clamped to the shaft member 16 with clamping bolts 21. Bolts 20 extend through the walls of wheel housing 4 and are rigidly secured to said housing by means of nuts 22 and lockwasher 23. The cuplike washers 24 and 25 are of an insulating material to cut down noise.

Figure 3:
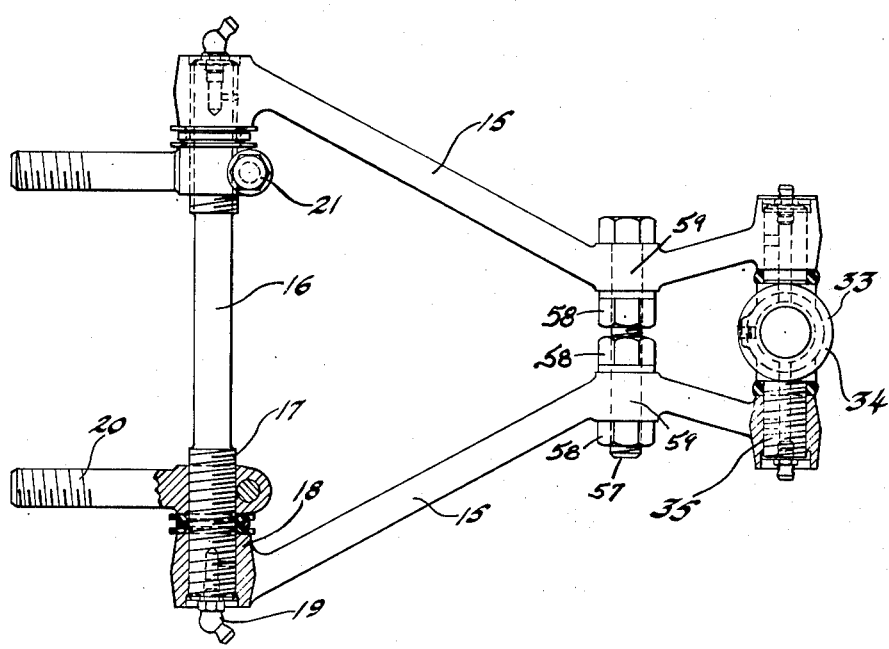
Figure 3 is a detailed view of one of the control arm assemblies.

The wheel 7 is supported on wheel spindle 27, which may consist of a forging having an offset boss portion 28 with a tapered bore for receiving the tapered lower end of king pin 29. The weight of the vehicle forces the king pin into the tapered bore of boss 28 to obtain a tight and non-rotative fit. A member which may consist of a forging 30 has a central portion with a tapered bore to receive the tapered lower end of king pin 29 and has outwardly extending bolt portions 32 onto which the outer ends of the control arms are threadedly mounted. The lower end of the king pin swivels within the tapered bore of forging 30 and an adjusting nut 61 may be tightened when desired to eliminate undesirable play between the king pin and forging. A forging 33 at the upper end of the king pin (which is shown best in Figure 3) has a central portion 34 which may be threadedly mounted on the upper end of the king pin 29 and may be provided with outwardly extending bolt portions 35 on which the outer ends of the upper control arms 13 may be threadedly mounted. The wheel spindle member 27 may have a boss portion 36 to which the steering linkage (not shown) may be fastened. At the outer end of spindle 27 an arm 37 may be secured by means of bolt 38 to provide a supporting connection for the lower end of shock absorber 39. The arm 37 may have a yoke portion 40 (one arm only of the yoke being shown in Figure 2) which yoke portion may partially embrace king pin 29 and be welded or otherwise secured thereto. The central portion 34 of forging 33 may have an upwardly extended threaded stud portion 41 onto which nut 42 is threaded for securing the cup-like member 43 relative to the upper end of the king pin 29. A second cup-like member 44 may have an ordinary square neck type stove bolt 46 extending through a square hole in the cup member 44 to prevent the cup turning relative to the bolt. The rubber-like snubber 45 is then secured to the interior of cup member 44 such as by vulcanization thereby anchoring the bolt. The stem of the bolt is threaded into the upper end of the threaded stud 41. Coil spring 47 is interposed between the king pin 29 and wheel housing 4. The walls 10 and 11 of wheel housing 4 are spaced apart to accommodate a cup-like stamping 48 for housing the upper end of coil spring 47. Stamping 48 lends additional rigidity to wheel housing 4. Another cup-like stamping 49 may be welded at its base to stamping 48 and protrudes downwardly within coil spring 47 to limit the upward travel of king pin 29, snubber 45 engaging the lower face of stamping 49 whenever wheels 7 engage road conditions sufficiently severe to cause spring 47 to be subjected momentarily to severe compression forces. Coil spring 47 absorbs the great majority of the jolts imparted to wheels 7 while the vehicle is traveling over rough terrain without causing snubber 45 to contact the lower face of stamping 49. It will be noted that the mounting of the coil spring 47 directly above the king pin 29 and thereby closely adjacent to the wheel 7 serves an important function in that spring 47 directly absorbs the vertical movement of king pin 29 thus relieving the control arms 13 and 14 of substantially all of the vertical load resulting from the weight of the vehicle. The spring 47 being mounted at a maximum radial distance from the control arm pivot shafts 16, where a longer range of vertical movement is afforded, can thus be made longer and more flexible resulting in a somewhat softer vehicle ride. The overhanging portion of the wheel housing which the coil spring 47 engages is structurally strong enough to support the vertical load of the vehicle relative to the wheels.

The upper end of shock absorber 39 may have a stem portion 50 which protrudes through the walls 10 and 11 of wheel housing 4 and is secured to said wheel housing.

Caster, camber, and "toe-in" adjustments of the wheel relative to the vehicle body (which adjustments are common in the art) are effected by the loosening and the re-tightening of nuts 51, 52, and 53, depending upon which type of adjustment is desired at the moment.

Having thus described my invention, what I claim is:

1. A suspension device for suspending a vehicle body relative to its wheels comprising a sheet material housing formed as part of the vehicle body, a wheel, a spindle for the wheel, a pin member carried by the spindle, said housing having a side wall alongside the pin member and a portion overhanging the pin member, arms having their ends pivotally secured respectively to the side wall of the housing and to opposite ends of the pin member, the overhanging portion of the housing having a recess therein, coil spring means received in the recess and having engagement with the upper end of the pin member, said spring means being in substantial axial alignment with the axis of the pin member.

2. A suspension device for suspending a vehicle body relative to its wheels comprising, a sheet material housing formed as part of the vehicle body, a wheel, a spindle for the wheel, a pin member carried by the spindle, said housing having a side wall adjacent the pin member and a portion overhanging the pin member, arms spaced from each other and having their ends pivotally secured respectively to the side wall of the housing and to opposite ends of the pin member, the overhanging portion of the housing having a recess therein, a coil spring received in the recess and being in engagement with the pin member, a resilient snubber secured to the upper end of the pin member and positioned inside of the coil spring and a cup-like member positioned inside the coil spring at the end opposite the snubber and against which the snubber impinges when the spring is excessively compressed.

3. A suspension device as set forth in claim 2 wherein the spring is substantially in axial alignment with the pin member.

4. A suspension device for suspending a vehicle body relative to its wheel comprising, a housing formed of sheet material and as part of the body and having a side wall portion and a roof portion, wheel carrying means secured to the side wall of the housing, and a coil spring interposed between the wheel carrying means and the roof portion of the housing, said roof portion having a recess for receiving one end of the coil spring.

5. The combination of a vehicle body and a suspension assembly for individually suspending the vehicle body relative to a wheel comprising: a wheel, a vehicle body, a portion of the vehicle body formed of sheet material and shaped as a housing adjacent to the wheel, said housing having a substantially upright wall portion and an outwardly turned roof portion partially overhanging the wheel, a pair of arm assemblies pivotally secured to the wall portion of the housing in spaced relation to each other, the roof portion of the housing having a recess therein, a pin associated with the vehicle wheel, a coil spring interposed between the upper end of the pin and the roof portion of the housing, one end of said spring being received in the recess of said roof portion, said spaced arm assemblies being pivotally secured at opposite ends of the pin for carrying the wheel relative to the vehicle body.

6. The combination of a vehicle body and a suspension assembly for individually suspending the vehicle body relative to a wheel comprising: a wheel, a vehicle body, a portion of the vehicle body formed of sheet material and shaped as a housing adjacent to the wheel, said housing having a substantially upright wall portion and outwardly turned roof portion, a spindle for the wheel, a king pin member carried by the spindle, said roof portion of the housing overhanging the king pin member, arm assemblies spaced from each other and having their ends pivotally secured respectively to the wall portion of the housing and to opposite ends of the king pin member, a coil spring interposed between the upper end of the king pin member and the roof portion of the housing and imposing thrust against the roof portion of the housing.

NILS ERIK WAHLBERG.

References Cited in the file of this patent

UNITED STATES PATENTS

| Number | Name | Date |
|---|---|---|
| 1,711,881 | Fornaca | May 7, 1929 |
| 2,018,653 | Best | Oct. 29, 1935 |
| 2,045,027 | Sanford | June 23, 1936 |
| 2,096,115 | Leighton | Oct. 19, 1937 |
| 2,290,923 | Wahlberg | July 28, 1942 |
| 2,305,174 | Leighton | Dec. 15, 1942 |
| 2,403,145 | Ulrich | July 2, 1946 |
| 2,455,429 | Lucien | Dec. 7, 1948 |
| 2,466,832 | Wallace | Apr. 12, 1949 |